Sept. 22, 1925.
H. KOCH
1,554,581
PROCESS OF UTILIZING WASTE GASES FROM THE COOKERS IN CELLULOSE INDUSTRY
Filed Dec. 10, 1924
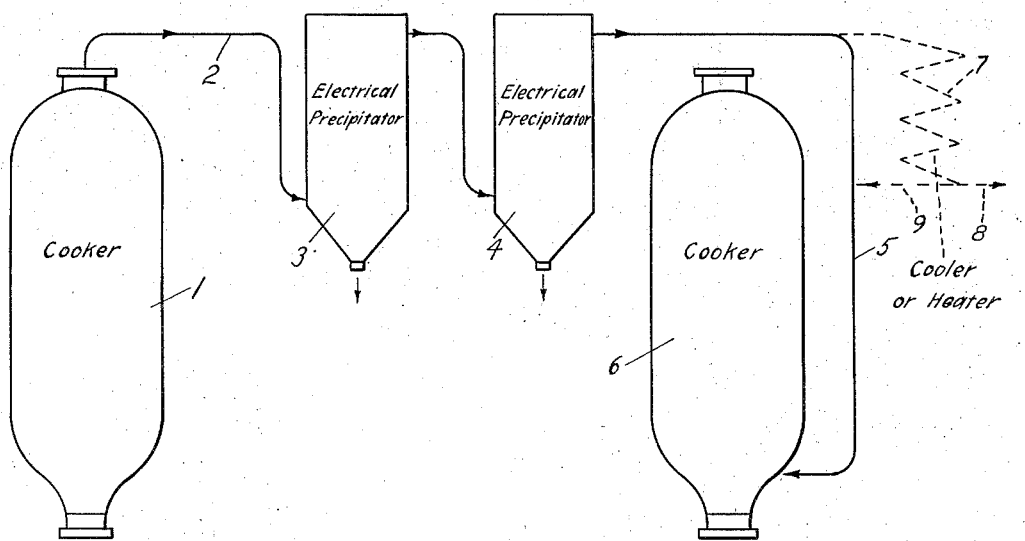
INVENTOR
Hanns Koch
BY
ATTORNEY Patented Sept. 22, 1925.

1,554,581

UNITED STATES PATENT OFFICE.

HANNS KOCH, OF FRANKFORT-ON-THE-MAIN, GERMANY, ASSIGNOR TO INTERNATIONAL PRECIPITATION COMPANY, OF LOS ANGELES, CALIFORNIA, A CORPORATION OF CALIFORNIA.

PROCESS OF UTILIZING WASTE GASES FROM THE COOKERS IN CELLULOSE INDUSTRY.

Application filed December 10, 1924. Serial No. 755,072.

*To all whom it may concern:*

Be it known that I, HANNS KOCH, a citizen of the German Republic, residing at Frankfort-on-the-Main, Hesse-Nassau, have invented a new and useful Process of Utilizing Waste Gases from the Cookers in Cellulose Industry, of which the following is a specification.

This invention relates to a process for utilizing waste gases from the cookers in the cellulose industry. It concerns especially the separation from such waste gases of organic constituents, particularly aromatic compounds, and above all those which are injurious to the cooking process. According to the invention the gases are kept hot and are led through a suitable electrical precipitation apparatus (Cottrell-Möller apparatus), which is adapted to withstand acid and high temperature, and can without difficulty be fractionally operated in such manner that by producing a certain drop in temperature the several organic constituents of the waste gases, for example, cymol and furfurol are obtained separately from one another and can be utilized for further application. After passing through the electrical precipitating apparatus the waste gases are either led into a cooler and from there into a lime tower or liquor vat or led through preheaters to cookers. In this manner it is possible, simultaneously with the utilization of the waste heat, to recover the $SO_2$ gas free from organic acids injurious to the cooking process.

The accompanying diagrammatic drawing illustrates the manner in which the process may be carried out.

From the cooker 1 the waste gas conduit 2 leads to the electrical precipitating apparatuses 3 and 4 arranged in series. In these apparatuses the temperature is regulated in such manner that the water vapor of the waste gases remains in vapor form while the constituents with higher boiling points are separated in the apparatuses 3 and 4. The arrangement can easily be so differentiated and the temperatures in the respective precipitators so regulated that the cymol is condensed and precipitated from the cooker waste gases in the precipitating apparatus 3 while the furfurol is obtained in the apparatus 4.

By keeping the temperature high the waste gases may be conducted through the conduit 5 into a second cooker 6. Another possibility is that the gases may after passing through the electrical precipitating apparatuses 3 and 4 be conducted through a cooler 7 and through a conduit 8 to a liquor vat. Furthermore the waste gases after passing through the electrical operation can be conducted to an absorption tower or lime tower. When the waste gases are conducted into the cooker 6, the cooler 7 can be replaced by a preheater interposed in the return circuit 9. Furthermore many other modifications are possible in carrying out the process.

It will be understood that the process as above described is applied in connection with a sulphite pulp process, the cooker 1 being that usually employed in such processes and the waste gases consisting largely of sulfur dioxide produced in the cooking operation. The waste gases after removal of the organic acids therefrom may be utilized in production of sulphite of lime or soda for further use in the process or may be passed to another cooker containing sulphite so as to be absorbed in the sulphite liquor.

The regulation of the temperature of the gases in the electrical precipitators may be effected by thermal insulation of the precipitators and of the conduits connected therewith, or by steam jacketing the same, or otherwise.

What I claim is:

1. A process for utilization of waste cooker gases in the cellulose industry consisting in subjecting waste gases while maintained at a sufficiently high temperature to prevent condensation of water, to electrical precipitating operation in such a manner that the organic material contained therein is separated therefrom.

2. A process according to claim 1 in which the electrical precipitating operation is carried on in a plurality of precipitators in such manner as to fractionally separate the different organic constituents of the waste gases by maintaining a temperature drop between successive precipitating operations.

3. A process for utilization of waste cooker gases in the cellulose industry consisting in subjecting the waste gases while maintained at high temperature, to electrical precipitating operation in such manner that organic material contained therein is separated therefrom.

4. A process according to claim 3 in which the electrical precipitating operation is carried on in a plurality of electrical precipitators in such manner as to fractionally separate the different organic constituents of the waste gases by maintaining a temperature drop between successive precipitating operations.

5. A process for utilizing waste cooker gases in the cellulose industry consisting in subjecting the waste gases containing SO to electrical precipitation to separate therefrom organic material therein while maintaining such gases at a sufficiently high temperature to prevent condensation of water, carrying on the electrical precipitation in two stages, one at a temperature suitable for precipitating cymol-containing liquids and the other at a temperature suitable for precipitating furfurol-containing liquids.

In testimony whereof I have hereunto subscribed my name this 25th day of November 1924.

HANNS KOCH.